Feb. 28, 1961 J. K. DOUGLAS 2,972,962
HYDRAULIC THRUST BEARING
Filed July 16, 1956 9 Sheets-Sheet 1

FIG. 1

INVENTOR
JAMES K. DOUGLAS
BY *Wesley P. Merrill*
ATTORNEY

Feb. 28, 1961  J. K. DOUGLAS  2,972,962
HYDRAULIC THRUST BEARING
Filed July 16, 1956  9 Sheets-Sheet 2

INVENTOR
JAMES K. DOUGLAS
BY *Wesley Merrill*
ATTORNEY

Feb. 28, 1961

J. K. DOUGLAS 2,972,962

HYDRAULIC THRUST BEARING

Filed July 16, 1956

INVENTOR
JAMES K. DOUGLAS
BY *Wesley Merrill*
ATTORNEY

Feb. 28, 1961 J. K. DOUGLAS 2,972,962
HYDRAULIC THRUST BEARING
Filed July 16, 1956 9 Sheets-Sheet 5

INVENTOR
JAMES K. DOUGLAS
BY *Wesley P. Merrill*
ATTORNEY

Feb. 28, 1961

J. K. DOUGLAS 2,972,962

HYDRAULIC THRUST BEARING

Filed July 16, 1956

INVENTOR
JAMES K. DOUGLAS
BY *Wesley P. Merrill*
ATTORNEY

Feb. 28, 1961 J. K. DOUGLAS 2,972,962
HYDRAULIC THRUST BEARING
Filed July 16, 1956 9 Sheets-Sheet 7

INVENTOR
JAMES K. DOUGLAS
BY
ATTORNEY

Feb. 28, 1961 J. K. DOUGLAS 2,972,962
HYDRAULIC THRUST BEARING
Filed July 16, 1956 9 Sheets-Sheet 8

INVENTOR
JAMES K. DOUGLAS
BY *Wesley P. Merrill*
ATTORNEY

Feb. 28, 1961 — J. K. DOUGLAS — 2,972,962
HYDRAULIC THRUST BEARING
Filed July 16, 1956 — 9 Sheets-Sheet 9

INVENTOR
JAMES K. DOUGLAS
BY
ATTORNEY

United States Patent Office 2,972,962
Patented Feb. 28, 1961

2,972,962
HYDRAULIC THRUST BEARING

James K. Douglas, Shorewood, Wis., assignor to The Oilgear Company, Milwaukee, Wis., a corporation of Wisconsin Filed July 16, 1956, Ser. No. 597,944

6 Claims. (Cl. 103—162)

This invention relates to hydraulic thrust bearings of the type employed to transmit thrust from one to the other of two relatively rotatable members. Thrust bearings constructed according to the invention are particularly adapted for use in hydrodynamic machines, and the invention will be explained as being used for that purpose but it is not limited to such use.

In an axial type hydrodynamic machine, which may be either a pump or a motor, the piston thrust is transmitted through a swash plate member to a reaction member one of which is rotatable relatively to the other. Heretofore, some hydrodynamic machines have had an annular bearing plate fitted between the two members and provided in one face thereof with a plurality of pressure pockets which, during relative rotation of the two members, registers successively with a plurality of holes which extend through the swash plate member and communicate with the cylinders so that the pockets are supplied with liquid from the cylinders. Liquid will seep from the pockets and form a lubricating film between the mating faces of the bearing plate on the swash plate member.

The pressure in the pockets on the pressure side of the machine is the same as the pressure in the cylinders on the same side of the machine and it extends into the lubricating film. The liquid in the pockets acts as a liquid bearing and the face of the bearing plate around and between the pockets is a bearing area which normally is covered by the lubricating film. The pressure in the film at the edges of the pockets is the same as the pressure in the pockets and it decreases to zero at the edges of the bearing area. The pockets and the bearing area must be so proportioned that the forces exerted by the liquid in the pockets and in the lubricating film is less than the piston thrust as otherwise they would cause separation of the mating surfaces and a resultant large loss of liquid.

A large part of the piston thrust is transmitted through the liquid in the pockets and the remainder thereof is transmitted through the bearing area. But when a machine of large capacity is operating under a very high pressure, the piston thrust is enormous, deflection of parts and distortion of metal occurs, and portions of the lubricating film are squeezed out and permit metal-to-metal contact between the relatively rotating surfaces, thereby causing abrasion of the parts of the bearing area and/or of the surfcae in contact therewith.

In a hydro-dynamic machine having its pistons and cylinders arranged either radially or axially in a rotatable cylinder barrel and a flat valve engaging the end of the cylinder barrel to control the flow of liquid to and from the cylinders, the face of the valve in contact with the cylinder barrel has two arcuate ports formed therein and communicating with passages which may be connected to an external circuit, and each cylinder communicates with a port which extends through the end of the cylinder barrel and registers during rotation of the cylinder barrel first with one and then the other of the two valve ports one of which is a high pressure port and the other of which is a low pressure port.

During operation of the machine, liquid seeps from the valve ports and forms a lubricating film between the face of the valve and the end of the cylinder barrel. Pressure extends from the high pressure valve port into that film and ordinarily enables it to prevent metal-to-metal contact between the valve and the cylinder barrel. But when the machine operates at very high pressures, portions of the film are sometimes squeezed out and abrasion of the valve and/or the cylinder barrel occurs.

The present invention has as an object to provide a hydraulic thrust bearing in which a lubricating film of liquid is positively maintained between two relatively rotating surfaces regardless of the magnitude of the thrust transmitted through the bearing or variations in the viscosity of the liquid in the film.

Another object is to provide hydraulic thrust bearing means which is more efficient than any such means heretofore employed between the swash plate member and the reaction member of a hydrodynamic machine.

Another object is to provide hydraulic thrust bearing means which is more efficient than any such means heretofore employed between the stationary valve and the rotatable member of a hydrodynamic machine.

These and other objects and advantages will appear from the following description of the embodiments of the invention illustrated in the accompanying drawings in which the views are as follows.

For the purpose of illustration, the invention has been shown incorporated in a hydrodynamic machine which is substantially the same as the hydrodynamic machine fully illustrated and described in application of Adolph R. Grad filed October 26, 1953, and issued as U.S. Patent 2,804,828, except that it has the present invention incorporated therein and is provided with piston and piston rod assemblies of the type shown in application Serial No. 545,242, filed November 7, 1955, now Patent No. 2,850,986. Therefore, only so much of the machine has been illustrated as is necessary for an explanation of the invention.

Such machines will function as pumps when driven mechanically and will function as motors when supplied with motive liquid. Since the function of a pump is substantially opposite to the function of a motor, the invention will be explained as being incorporated in a pump in order to simplify the description but it is to be understood that the invention is equally applicable to motors and that referring to the machine as a pump in no way limits the invention to pumps.

Figure 1:
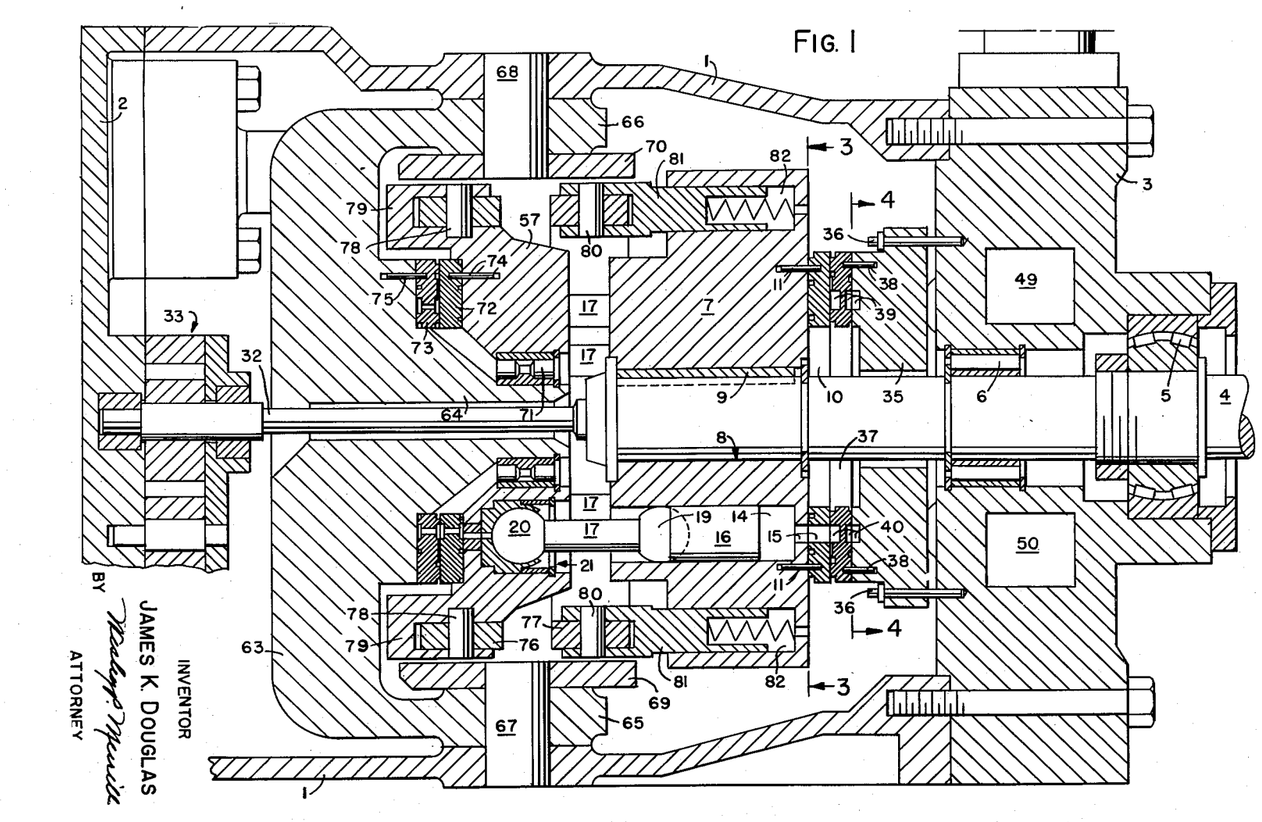
Fig. 1 is a vertical longitudinal section through a hydrodynamic machine having embodiments of the invention incorporated therein, certain parts of the machine being broken away and omitted from the drawing.

As indicated in Fig. 1, the pump has its mechanism arranged within a casing 1 which is closed at its left end by a removable end head 2 and at its right end by a distributor block 3 through which liquid flows to and from an external circuit. Block 3 has a drive shaft 4 extending therethrough and rotatably supported therein as by means of two bearings 5 and 6. Shaft 4 extends outward beyond block 3 for connection to a source of power and its inner portion supports a cylinder barrel 7 which has a bore 8 extending therethrough to receive shaft 4. The pump has been made with its drive shaft extending through the left end of the casing and supported by drive shaft bearings which correspond to bearings 5 and 6 and are carried by end heads corresponding to end heads 2 and 3. Cylinder barrel 7 is fixed for rotation with shaft 4, as by means of a key 9, and it has been shown provided on its right end with a wear plate 10 as is customary in pumps of this type. Wear plate 10 forms substantially a part of cylinder barrel 7 and it is fixed for rotation therewith as by means of pins 11.

Cylinder barrel 7 has a plurality of cylinders 14 formed therein and equally spaced in a circular row which is concentric with shaft 4. Each cylinder 14 has an elongated port 15 extending from its inner end through the right end of cylinder barrel 7 and through wear plate 10. A piston 16 is fitted in each cylinder 14 and provided with a piston rod 17 by means of which piston 16 is reciprocated to cause liquid to flow into and out of the cylinder through its port 15.

Figure 2:
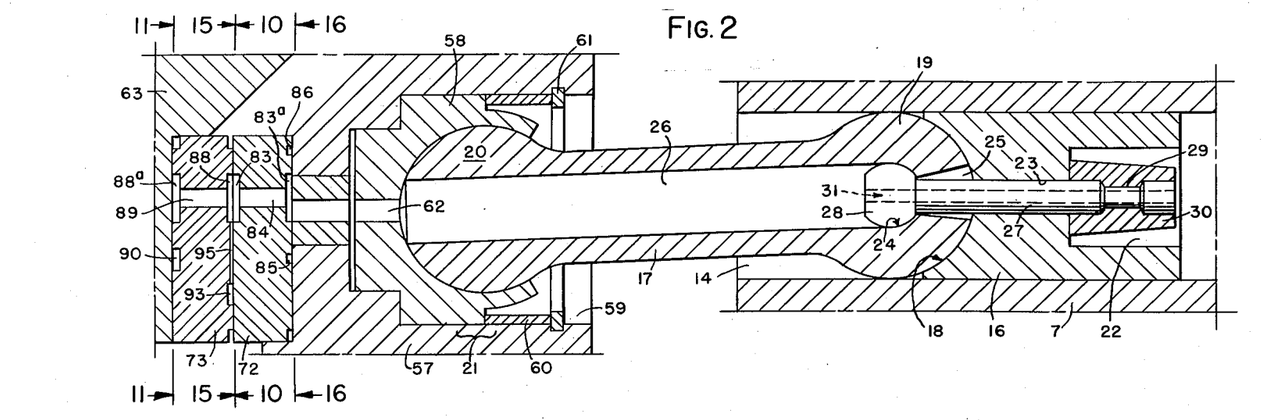
Fig. 2 is a fragmentary sectional view taken through the center of the piston and piston rod assembly shown in Fig. 1 but drawn to a much larger scale.
Figure 3:
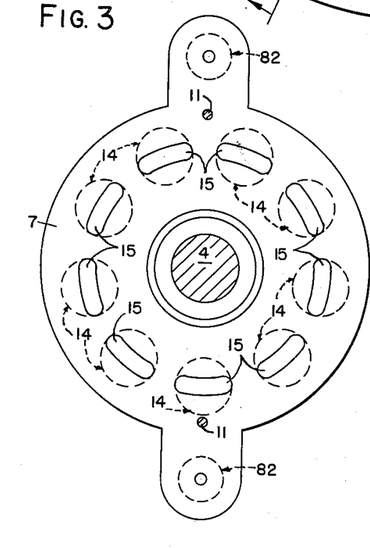
Fig. 3 is an end view of the cylinder barrel, the view being taken on the line 3—3 of Fig. 1.

The piston and piston rod assemblies are all alike and, as shown in Fig. 2, each piston 16 has formed in its outer end a spherical seat 18 which is complementary to and engaged by a spherical head 19 forming one end of piston rod 17 the other end of which is formed into a spherical head 20 which forms a part of a ball and socket joint 21 as will presently be explained. Head 19 is nearly as large in diameter as cylinder 14 to provide between it and piston 16 bearing surfaces which are of maximum area to thereby permit very high pumping forces to be transmitted therethrough and thereby enable piston 16 to create very high pressures in cylinder 14.

Piston 16 has a recess 22 extending into it from its inner end and a bore 23 extending from recess 22 through seat 18. Piston rod 17 has a spherical seat 24 formed within head 19 concentric with seat 18, a tapered opening 25 extending from seat 24 through head 19 and a bore 26 extending from seat 24 through head 20.

Head 19 is held in contact with seat 18 by a pin 27 having a spherical head 28 the surface of which is complementary to and in contact with seat 24. Pin 27 extends through opening 25 and bore 23 into recess 22 and has a cannelure 29 formed in the portion which extends into recess 22. When connecting piston 16 and piston rod 17 to each other, head 28 is urged against seat 24, head 19 is urged against seat 18 and then a head 30 of suitable metal is swaged into cannelure 29 with its inner end in contact with the end wall of recess 22, thereby preventing any relative axial movement between piston 16 and rod 17 while permitting rod 17 to gyrate relatively to piston 16 as cylinder barrel 7 rotates.

In order to provide liquid for lubrication and hold-up purposes, pin 27 has extending axially therethrough a passage 31 through which liquid can flow and pressure can extend from cylinder 14 into the passage 26 in rod 17. In order to provide liquid for control purposes, shaft 4 is connected by a shaft 32 to a gear pump 33 (Fig. 1) which is carried by end head 2 but will not be described because it does not form any part of the present invention.

Figure 18:
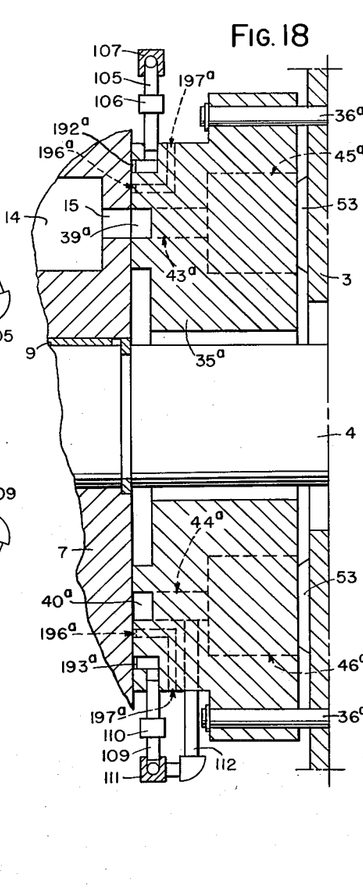
Fig. 18 is a view taken through the valve shown in Fig. 17 and through portions of adjacent parts, the plane of the view being indicated by the line 18—18 of Fig. 17.

The flow of liquid into and out of the several cylinders 14 is controlled by a flat valve 35 which encircles shaft 4 and is restrained from rotation by pins 36. The flat face of the valve serves as a bearing surface and may engage the flat end of the cylinder barrel as indicated in Fig. 18 but it has been customary for a long time to provide wear plates between the cylinder barrel and the valve in pumps of this type. As shown, an annular bearing plate 37 is mounted upon the flat face of valve 35 and forms in effect a part of valve 35. Plate 37 is substantially in contact with the wear plate 10 on cylinder barrel 7 and it is supported and prevented from rotating with cylinder barrel 7 by pins 38.

During rotation of cylinder barrel 7, each cylinder port 15 registers alternately with two arcuate valve ports 39 and 40 which are found in plate 37 and in valve 35. In order to stiffen plate 37, it has a plurality of struts 41 formed integral therewith and joining opposite sides of port 39 and a plurality of struts 42 formed integral therewith and joining opposite sides of port 40, the struts being thinner than plate 37 and spaced from both faces thereof. Plate 37 also has the invention incorporated therein by providing it with certain recesses and grooves as will presently be explained.

Figure 4:
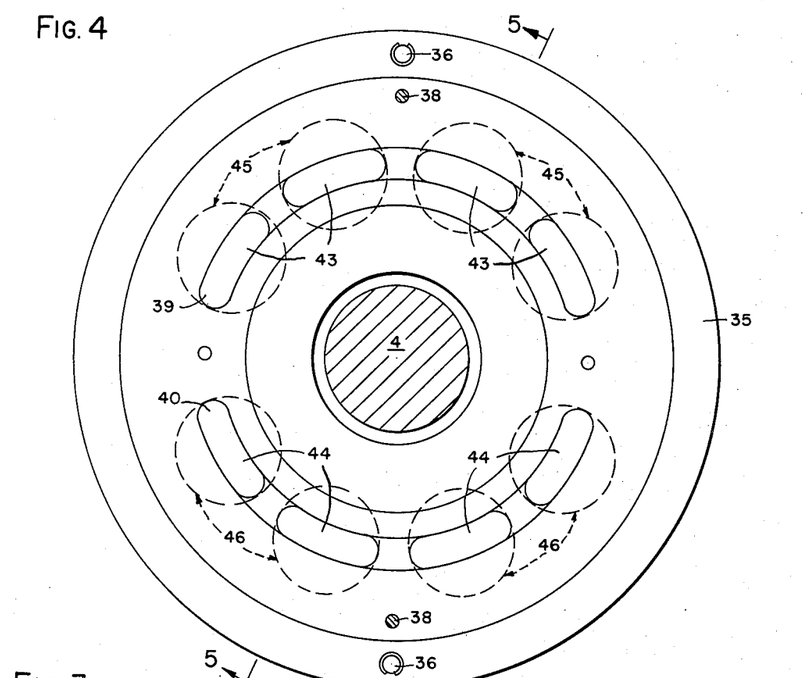
Fig. 4 is a face view of the valve which controls the flow of liquid to and from the cylinders, the view being taken on the line 4—4 of Fig. 1 but drawn to a larger scale.

Valve port 39 communicates with a plurality of oblong holes 43, four being shown in Fig. 4, and valve port 40 communicates with an equal number of oblong holes 44. Each hole 43 communicates with a hold-up motor 45 and each hole 44 communicates with a hold-up motor 46 all of which are arranged within valve 35. Each hold-up motor 45 registers with a hole 47 (Fig. 5) and each hold-up motor 46 registers with a hole 48 which are formed in block 3, only one hole 47 and one hole 48 appearing in the drawing. Holes 47 and 48 communicate, respectively, with two passages 49 and 50 which are formed in block 3 and are adapted to be connected to opposite sides of a hydraulic circuit.

Figure 5:
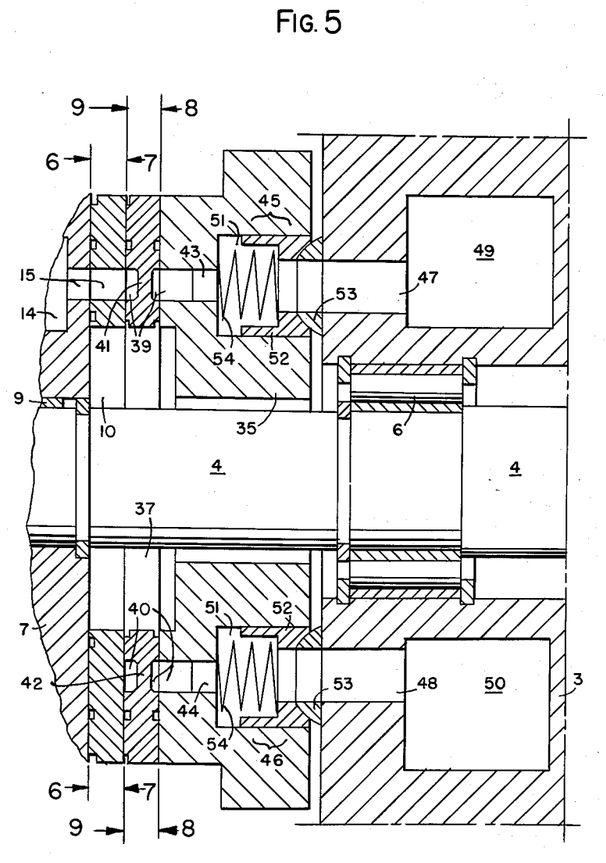
Fig. 5 is a section taken through the valve of Fig. 4 and through adjacent parts and portions of other adjacent parts, the plane of the view being indicated by the line 5—5 of Fig. 4.

The hold-up motors are all alike and, as shown in Fig. 5, each includes a cylinder 51 which is formed in valve 35, a tubular piston 52 which is fitted in cylinder 51, an annular sealing member 53 which is arranged between piston 52 and block 3, and a spring 54 which is arranged between piston 52 and the end wall of cylinder 51 to initially urge valve 35 against cylinder barrel 7, piston 52 against member 53 and member 53 against block 3. The contacting surfaces of member 53 and block 3 are made flat and smooth and the contacting surfaces of member 53 and piston 52 are made spherical and smooth to provide substantially liquid tight joints therebetween while permitting valve 35 to adjust itself to the end of cylinder barrel 7.

Whenever the pump is creating pressure, valve 35 is urged away from the end of cylinder barrel 7 by a blow-off force which is created by the pressure in the cylinder ports communicating with the high pressure valve port 39 or 40 and by the pressure in the film of liquid between the face of valve 35 and the end of cylinder barrel 7. But the pressure in the high pressure valve port 39 or 40 extends into the hold-up motors 45 or 46 in communication therewith and enables those motors to urge valve 35 toward cylinder barrel 7 with a force proportional to the pressure.

Valve 35 is also provided with balancing motors (not shown) which are intermittently energized, as shown and explained in U.S. Patent 2,804,828, and the sum of the forces exerted by the hold-up and balancing motors slightly exceeds the blow-off force so that the adjacent surfaces of cylinder barrel 7, wear plate 10, bearing plate 37, and valve 35 are firmly held in contact.

Pistons 16 are reciprocated by motion transmitted thereto through a swash plate 57 (Fig. 1) to which the several pistons 16 are connected by the piston rods 17 and the ball and socket joints 21. As shown in Fig. 2, each joint 21 includes the head 20 on a rod 17 and a spherical socket 58 which is closely fitted upon head 20 and is fitted within a pocket 59 formed in swash plate 57.

In order that swash plate 57 may pull pistons 16 outward on suction strokes, that part of socket 58 outward from its transverse centerline is spun or swaged into contact with the surface of head 20 and a retainer ring 60 is arranged between socket 58 and a snap ring 61 arranged in a suitable groove formed in the wall of pocket 59. Liquid may flow and pressure may extend from the passage 26 in rod 17 to the left-hand face of swash plate 57 through a passage 62 formed in swash plate 57 and in socket 58.

Swash plate 57 is rotatably supported by a stationary reaction member or cradle 63 having an integral central horn 64 and two integral arms 65 and 66 which are arranged diametrically opposite each other and are pivotally supported by two trunnions 67 and 68, respectively. Trunnion 67 is carried by the lower wall of casing 1 and by a web 69 which is formed integral with casing 1. Trunnion 68 is carried by the upper wall of casing 1 and by a web 70 which is formed integral with casing 1. Trunnions 67 and 68 are ordinarily provided with anti-friction bearings which have been omitted from the drawing in order to simplify the view.

Figure 13:
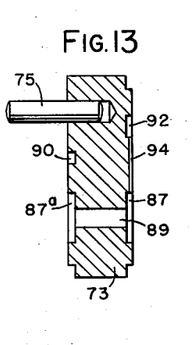
Fig. 13 is a sectional view taken on the line 13—13 of Fig. 10 but drawn to the same scale as Fig. 2.

The radial components of the pumping forces are transmitted through a bearing 71 which is carried by horn 64 and rotatably supports swash plate 57. The axial components of the pumping forces may be transmitted directly between swash plate 57 and cradle 63 and a trust bearing embodying the present invention be formed integral therewith but preferably they are transmitted through an annular thrust transmitting wear plate 72 and an annular thrust receiving bearing plate 73 in which the present invention is embodied and which will presently be described. As shown in Figs. 1 and 2, wear plate 72 engages the flat left face of swash plate 57 and is fixed for rotation therewith as by means of a pin 74 so that it forms substantially a part thereof, and bearing plate 73 is carried by cradle 63 and is restrained from rotation by a pin 75 so that it forms substantially a part of cradle 63. Means comprising pins 74 and 75 support the wear plate and the bearing plate, respectively, for axial movement relative to their respective supporting members, as indicated in Figs. 1 and 13.

Swash plate 57 is fixed for rotation with cylinder barrel 7 by a universal joint comprising two rings 76 and 77 which encircle swash plate 57. Ring 76 is pivotally connected by two pins 78 to two arms 79 formed upon swash plate 57 diametrically opposite each other. Ring 77 has two pins 80 extending therethrough in the same radial plane as pins 78. Each pin 80 connects ring 77 to a plunger 81 which is slideable in a bore 82 formed in cylinder barrel 7. Rings 76 and 77 are pivotally connected to each other at diametrically opposite points spaced 90° from pins 78 and 80.

The arrangement is such that, when cylinder barrel 7 is rotated and cradle 63 is inclined to shaft 4, universal joint 76—81 will rotate swash plate 57 with cylinder barrel 7 and swash plate 57 will reciprocate pistons 16 and thereby cause the pump to discharge liquid in a direction and at a rate dependent upon the direction and distance cradle 63 is inclined from its neutral position.

Figure 15:
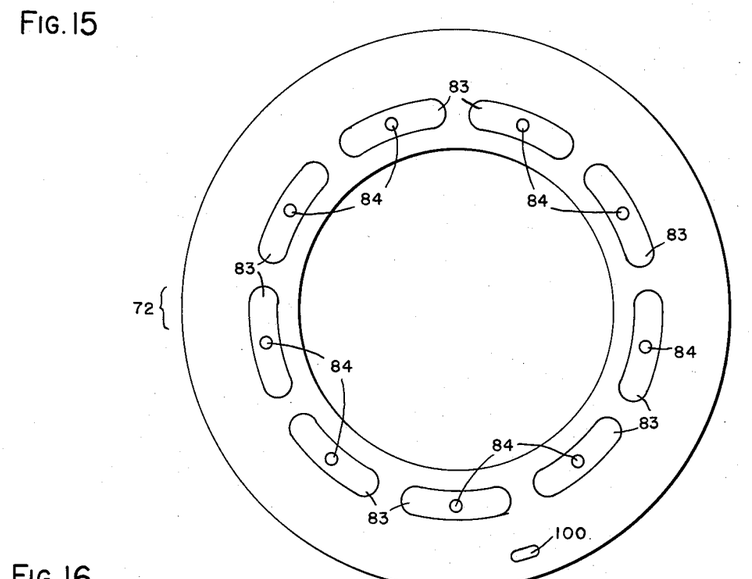
Fig. 15 is a view of one face of a wear plate which cooperates with the thrust bearing plate shown in Fig. 10, the view being taken in the plane indicated by the line 15—15 of Fig. 2 but drawn to the same scale as Fig. 10.
Figure 16:
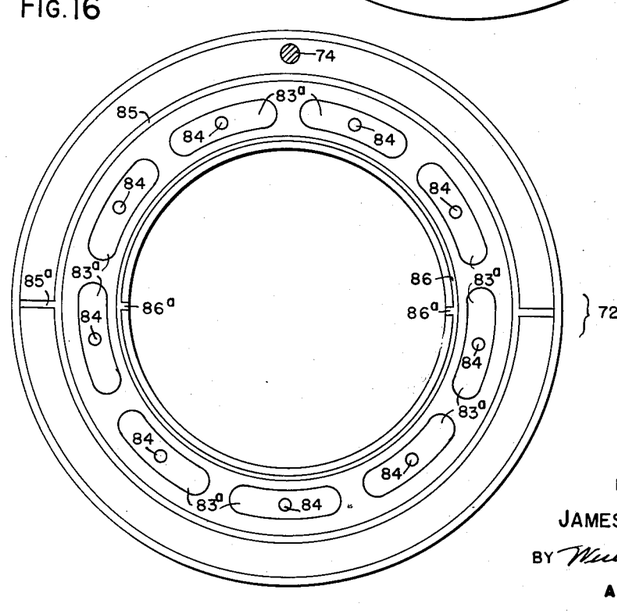
Fig. 16 is a view of the other face of the plate shown in Fig. 15, the plane of the view being indicated by the line 16—16 of Fig. 2.

Referring now to Figs. 15 and 16, wear plate 72 has a plurality of recesses 83 formed in the face thereof which engages bearing plate 73 and a recess 83$^a$ formed in its opposite face in axial alignment with each recess 83 and connected thereto by a hole 84. Recesses 83 and 83$^a$ are arranged in circular rows with each pair of recesses in the radial plane of a pumping cylinder 14.

Each recess 83$^a$ registers with a passage 62 (Fig. 2) in the same radial plane so that the pressure in each pair of recesses 83 and 83$^a$ is the same as the pressure in the cylinder 14 in the same radial plane. That is, the pressure in each pair of recesses 83 and 83$^a$ will be the same as the pump pressure during one-half of each revolution of cylinder barrel 7 and will be approximately zero during the other half of each revolution of cylinder barrel 7.

Pressure in recesses 83$^a$ will cause liquid to seep therefrom and form a film of liquid between the adjacent faces of plate 72 and swash plate 57 and pressure will extend into that film from the recesses containing pressure. In order to limit the area of the film into which pressure can extend, two annular limit grooves 85 and 86 are formed in plate 72 upon opposite sides of recesses 83$^a$ and are connected to drain by radial grooves 85$^a$ and 86$^a$, respectively.

The bearing face of plate 73, which is engaged by wear plate 72, has two diametrically opposed arcuate ports 87 and 88 (Fig. 10) formed therein upon the same radius as the recesses 83 in wear plate 72. When the pump is discharging liquid under pressure, recesses 83 communicate with one of ports 87 and 88 during the time that they contain liquid at pump pressure and they communicate with the other of ports 87 and 88 during the time that they contain liquid at approximately zero pressure so that pump pressure prevails in one or the other of ports 87 and 88 depending upon the direction in which swash plate 57 is inclined to the pump axis. During rotation of swash plate 57 and wear plate 72, the pressure in recesses 83 and in the high pressure ports 87 or 88 will cause liquid to seep therefrom and form a lubricating film between the mating faces of plates 72 and 73.

In order to prevent pressure in port 87 or 88 from causing distortion of plate 73, two arcuate recesses 87$^a$ and 88$^a$ (Fig. 11) of substantially the same size and shape as ports 87 and 88 are formed in the opposite face of plate 73 in axial alignment with ports 87 and 88, respectively, and are connected thereto by holes 89 (Figs. 10–13) so that the pressure in each of recesses 87$^a$ and 88$^a$ is the same as the pressure in the port 87 or 88 in alignment therewith.

The pressure in the recess 87$^a$ or 88$^a$ which is connected to the high pressure port 87 or 88 will cause liquid to seep therefrom and form a film of liquid between plate 73 and cradle 63, and pressure will extend into that film. The area of film into which pressure can extend is limited by an annular groove 90 which is formed in plate 73 radially outward from recesses 87$^a$ and 88$^a$ and is connected to drain by radial grooves 90$^a$. The liquid seeping radially outward from the recesses can escape to exhaust through grooves 90 and 90ᵃ and liquid seeping radially inward from the recesses can escape to exhaust through one or more axial slots 91 formed in the inner peripheral surface of plate 73.

When the pump is functioning, the pressure in the cylinders 14 containing inward moving pistons acts upon the ends of those pistons and urges the piston and piston rod assemblies and the swash plate toward cradle 63 with a force which is proportional to pump pressure. However, the pump pressure extends into the port 87 or 88 which is the high pressure port, as explained above, and causes the liquid in that port and in the lubricating film to exert a force in opposition to the force exerted by the pressure in cylinders 14.

In a pump having a small to medium volumetric capacity and operating at moderate pressures, the force exerted by the pressure in the pumping cylinders can be transmitted to the reaction member or cradle through the liquid between the mating surfaces of the wear plate and the bearing plate. But in a pump having a large volumetric capacity and operating at a very high pressure, the force exerted by the liquid in the pumping cylinders is tremendous and is so great that it tends to squeeze out the lubricating film between the wear plate and the bearing plate and it causes the reaction member or cradle to deflect even when the cradle is made as thick and strong as is commercially practicable. The deflection is very small, being only about .0002″ in a properly designed reaction member or cradle, but the lubricating film is very thin and the deflection is sufficient to cause destruction of parts of the film even if the liquid between the wear plate and the bearing plate would otherwise be capable of transmitting the force exerted by the pressure in the pumping cylinders.

Figure 14:
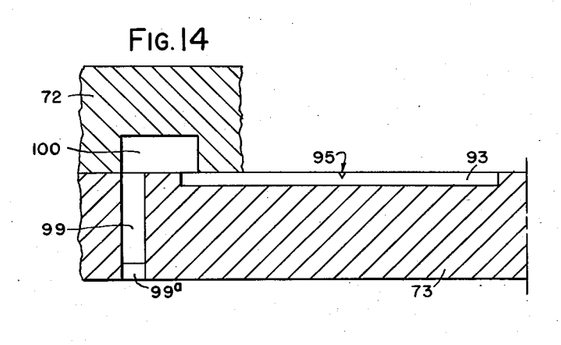
Fig. 14 is a sectional view taken on the arcuate line 14—14 of Fig. 10 but drawn to a much larger scale.

In order to positively maintain a lubricating film of liquid between the mating faces of the wear and bearing plates and thereby prevent metal-to-metal contact therebetween with resultant abrasion thereof, plate 73 also has formed in its bearing face a plurality of pressure recesses 92 and a plurality of pressure recesses 93 which are arranged radially outward, respectively, from ports 87 and 88. Each recess 92 is connected to port 87 by a restricted passage 94 and each recess 93 is connected to port 88 by a restricted passage 95. Passages 94 and 95 have been shown as being shallow grooves formed in the bearing face of plate 73 and as being V-shaped in cross-section (Fig. 14). In the particular size of pump shown, grooves 94 and 95 are about 1/64″ deep.

The pressure in the port 87 or 88 which is the high pressure port will cause liquid to flow therefrom through the passages 94 and 95 into the recesses 92 or 93 radially outward therefrom but the pressure in the recesses will be lower than the pressure in the port due to the resistance offered by the restricted passages. The liquid in the high pressure port 87 or 88 and in the pressure recesses connected thereto act as liquid bearings through which a large part of the force is transmitted and the balance of the force is transmitted through the film of liquid between plates 72 and 73.

It has previously been explained that the pressure in recesses 83 and in the port 87 or 88 which is the high pressure port will cause liquid to seep therefrom and form a lubricating film between the mating faces of plates 72 and 73 but the film is formed in part by liquid which seeps from the pressure recesses 92 or 93 which are connected to the high pressure port 87 or 88. In order to limit the area of the film into which pressure can extend, a plurality of drain pockets 96 are formed in the bearing face of plate 73 between each of ports 87 and 88 and the pressure recesses radially outward therefrom. Drain pockets 96 are in axial alignment with drain groove 90 and each is connected thereto by a hole 97.

The pressure in the film on the high pressure side of the pump is substantially equal to pump pressure at the edges of the high pressure port 87 or 88 and it gradually decreases to zero at the edges of the adjacent drain pockets 96 and at the inner edge of the bearing face of plate 73. The pressure in the film at the edges of the pressure recesses 92 or 93 which are connected to the high pressure port 87 or 88 is substantially the same as the pressure in those recesses and it gradually decreases to zero at the edges of the adjacent drain pockets 96 and at the outer edge of the bearing face of plate 73. The drain recesses 96 thus substantially interrupt the entire front face of the bearing and prevent fluid flow across the face of the bearing between the high pressure ports 87, 88 and the pressure recesses 92, 93. Fluid flows across the face of the bearing from high pressure ports 87, 88 to a drain provided by the inner periphery of the plate 73 and to the drain recesses 96; and fluid flows across the face of the bearing from the pressure recesses 92, 93 to drain provided by the outer periphery of the bearing plate 73 and by the drain recesses 96. The drain recesses thus divide the front faces of bearing plate 73 and thrust plate 72 into a first pressure area radially inward of the drain recesses which area is subject to the operating pressure of the fluid in holes 62 of the rotatable member, which is the same as the pumping pressure of the machine.

The drain groove 90 in the back face of the bearing plate and the drain groove 85 in the back face of the wear plate define pressure areas radially inward thereof subject to the operating pressure that are each effective to produce forces opposed and equal to the force produced by the operating pressure on the first pressure area between the front faces of the bearing plate and wear plate.

The drain recesses 96 also define a second pressure area radially outward therefrom between the front faces of the bearing plate and the wear plate that is subject only to the pressure of the fluid in the pressure recesses, which are regulated about a predetermined proportion of the operating pressure by the restriction passages 94, 95.

If when the pump is operating the pump pressure should increase, the force tending to move swash plate 57 toward cradle 63 would correspondingly increase and would move wear plate 72 closer to bearing plate 73 and thereby reduce the rate at which liquid can flow through the lubricating film to drain but the rate of flow through the grooves 94 and 95 would be reduced but little. For example if the thickness of the film were reduced by one half, the rate at which liquid can flow through the film to drain would be reduced to about one quarter of its previous rate but the rate at which liquid can flow through grooves 94 or 95 would be reduced only about 2% due to the depth of the grooves.

Therefore, as soon as wear plate 72 moves closer to bearing plate 73 and reduces the rate at which liquid can escape from the pressure recesses 92 or 93 on the pressure side of the pump, the liquid flowing through passages 94 or 95 into those grooves will raise the pressure therein and thereby enable the liquid in those recesses to move plate 72 away from plate 73 until liquid is escaping through the film from pressure recesses 92 or 93 at the same rate at which it was flowing into recesses 92 or 93 through grooves 94 or 95. A decrease in pump pressure would have no effect upon plate 72 because there would be nothing to cause it to move. Consequently, the lubricating film between plates 72 and 73 is maintained at a substantially uniform thickness and danger of metal-to-metal contact between plates 72 and 73 is practically eliminated regardless of variations in pump pressure.

Since the thrust bearing thus far described functions to maintain a substantially uniform lubricating film of liquid between the mating surfaces of the stationary and rotatable members, of the bearing, plates 72 and 73 could be omitted and the openings in the mating faces thereof be formed in the adjacent faces of swash plate 57 and cradle 63.

However, it is preferable to construct the bearing as explained above and to attach plates 72 and 73 or the equivalents thereof to swash plate 57 and cradle 63, respectively, to form parts thereof because the motive liquid becomes contaminated with particles of foreign matter. It is customary to continuously pass a portion of the liquid in a hydraulic circuit through a filter but all of the foreign matter cannot be removed. Therefore, the mating surfaces of the thrust bearing should be very smooth and hardened to eliminate as far as possible the danger of the mating surfaces being scored by the particles of foreign matter.

Figure 10:
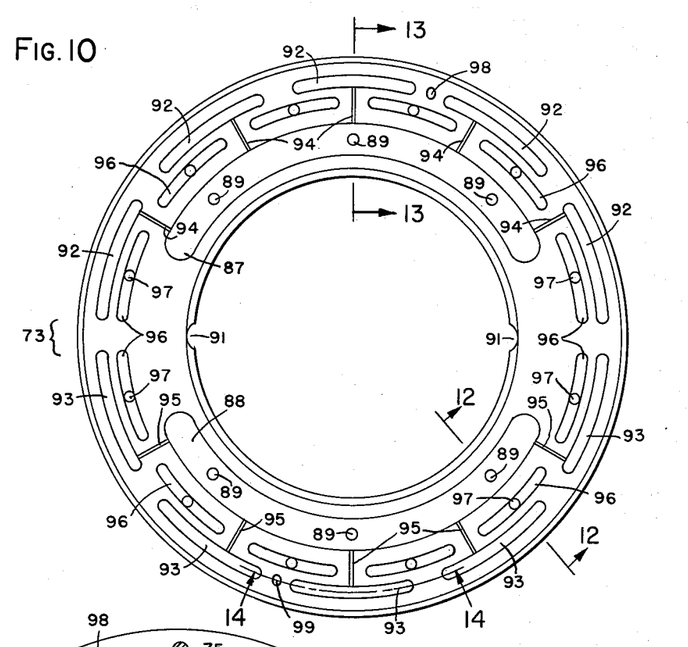
Fig. 10 is a view of one face of a thrust bearing plate in which the invention is embodied, the view being taken in the plane indicated by the line 10—10 of Fig. 2 but drawn to a smaller scale than Fig. 2.
Figure 11:
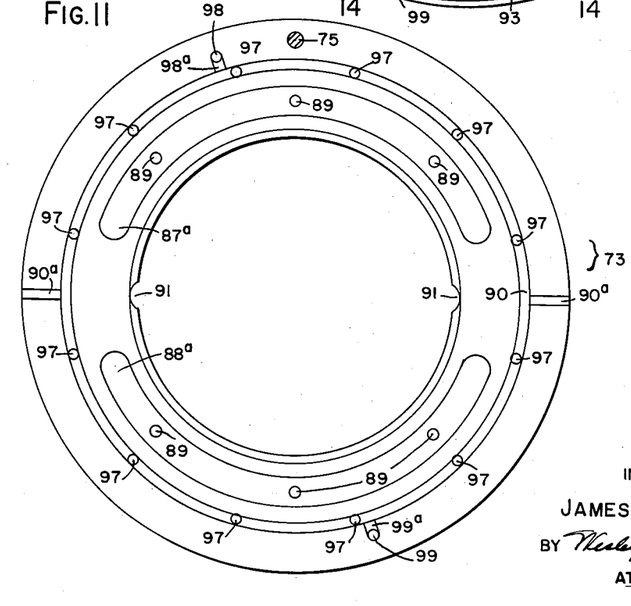
Fig. 11 is a view of the other face of the plate shown in Fig. 10, the plane of the view being indicated by the line 11—11 of Fig. 2.
Figure 12:
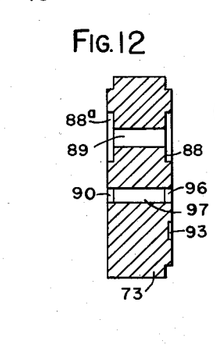
Fig. 12 is a sectional view taken on the line 12—12 of Fig. 10 but drawn to the same scale as Fig. 2.

By providing swash plate 57 and cradle 63 with plates 72 and 73, respectively, as thus far described and making the mating faces of the plates very smooth and hard, scoring was eliminated except for a very small amount near the outer peripheries of the plates. Such scoring appeared to be caused by particles of foreign matter which accumulated in recesses 92 and 93 for the reason that some of the particles of foreign matter entering the recess 92 or 93 on the pressure side of the pump were larger than the particles which could escape therefrom because the streams of liquid flowing into those recesses through the grooves 94 or 95 are much thicker than the film of liquid flowing out of those recesses. However, it was found that such scoring could be substantially eliminated in the following manner:

As shown in Figs. 10, 11 and 14, a small hole 98 is extended through plate 73 between two adjacent recesses 92 and connected to drain groove 90 by a radial slot 98ª, a small hole 99 is extended through plate 73 between the two adjacent recesses 93 and connected to drain groove 90 by a radial slot 99ª, and a small pocket 100 (Figs. 14 and 15) is formed in the face of wear plate 72 on the same radius as recesses 92 and 93.

The arrangement is such that some of the foreign particles accumulating in recesses 92 and 93 will be picked up by pocket 100 during rotation of plate 72. Then during the instant that pocket 100 connects the recess 92 or 93 on the pressure side of the pump to the hole 98 or 99 adjacent to that recess, the pressure in that recess will cause a shot of liquid to flow therefrom through pocket 100, the hole 98 or 99 and slot 98ª or 99ª into drain groove 90. The shot of liquid will carry particles of foreign matter with it into drain groove 90 and the leakage liquid flowing through groove 90 will carry the particles to drain.

Figure 6:
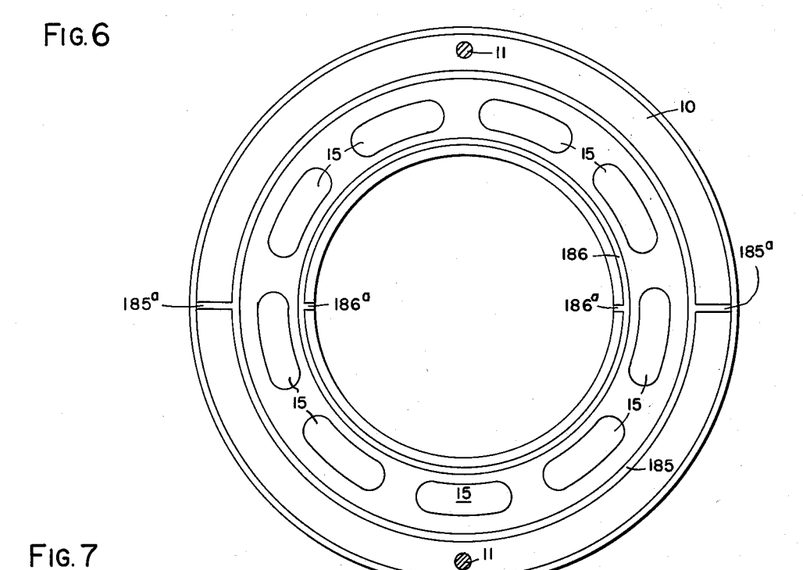
Fig. 6 is a view of the face of a wear plate which engages the end of the cylinder barrel shown in Fig. 3, the view being drawn to the same scale as Fig. 5 and taken on the line 6—6 thereof.
Figure 7:
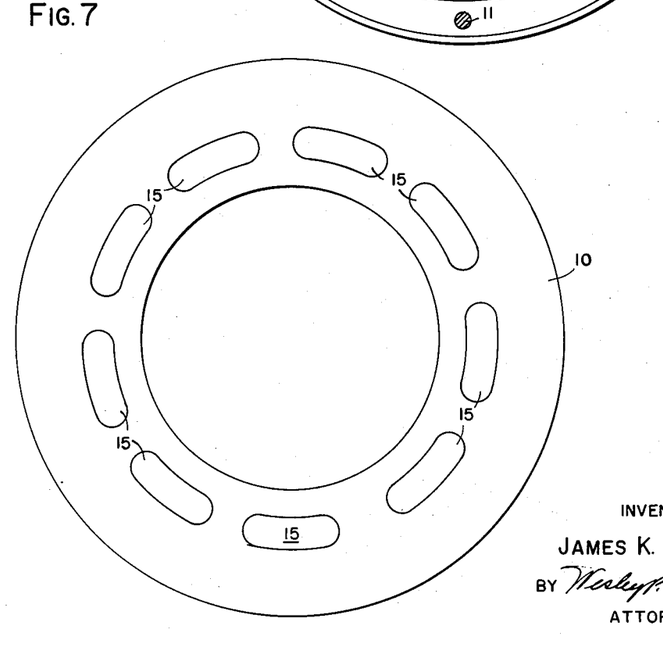
Fig. 7 is a view of the other face of the plate shown in Fig. 6, the plane of the view being indicated by the line 7—7 of Fig. 5.
Figure 8:
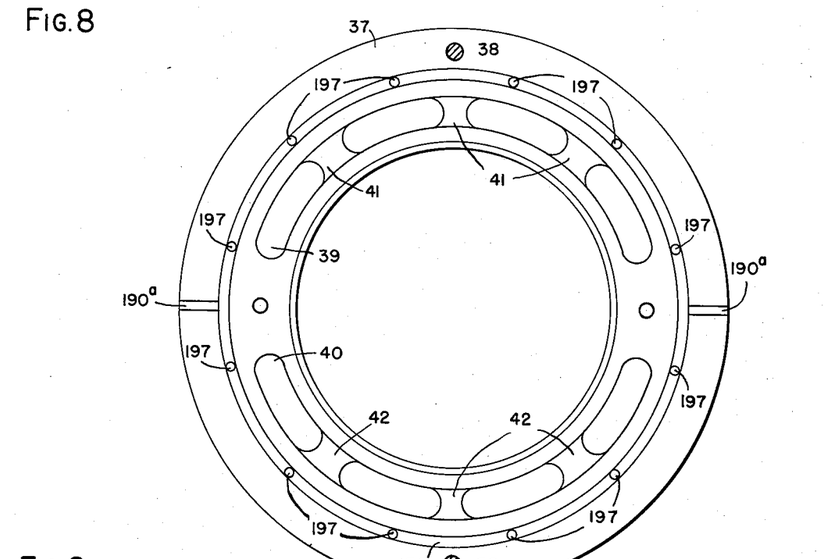
Fig. 8 is a view of the face of a thrust bearing plate which engages the face of the valve shown in Fig. 4, the view being taken on the line 8—8 of Fig. 5.
Figure 9:
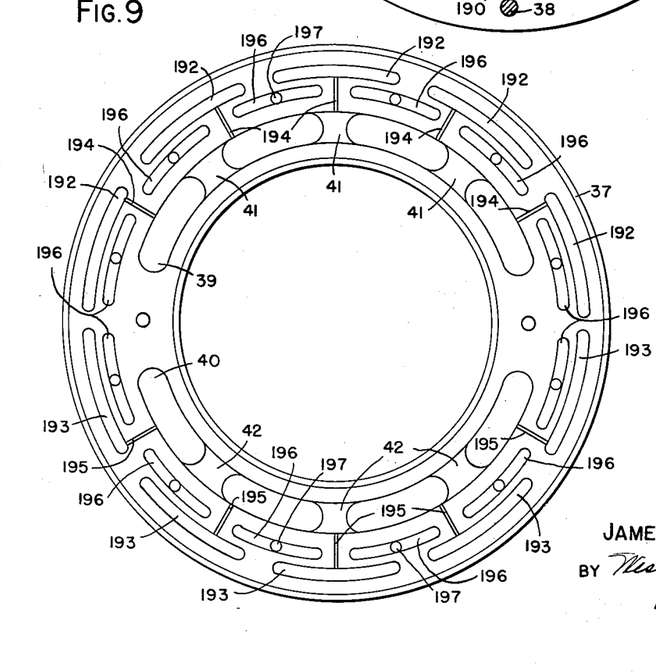
Fig. 9 is a view of the other face of the plate shown in Fig. 8, the view being taken on the line 9—9 of Fig. 5.

Valve 35 (Figs. 4 and 5), bearing plate 37 (Figs. 8 and 9) thereon and the wear plate 10 (Figs. 6 and 7) on cylinder barrel 7 as far as previously described are substantially the same as in certain prior pumps and would function satisfactorily under ordinary conditions. But in order to assure maintenance of the lubricating film of liquid between plates 10 and 37 regardless of how high a pressure the pump may create, bearing plate 37 is made very similar to bearing plate 73 except that ports 39 and 40 extend completely through the plate and form continuations of the ports 39 and 40 in valve 35.

More specifically, the face of plate 37 which engages wear plate 10 has formed therein a plurality of pressure recesses 192 which are radially outward from port 39 and are connected thereto by shallow radial grooves 194, a plurality of pressure recesses 193 which are radially outward from port 40 and are connected thereto by shallow grooves 195, and a plurality of drain pockets 196 which are arranged between port 39 and recesses 192 and between port 40 and recesses 193. Each drain pocket 196 is connected by a hole 197 to an annular drain groove 190 which is formed in the opposite face of plate 37 and connected to drain by radial grooves 190ª.

Pressure recesses 192 and 193, grooves 194 and 195 and drain pockets 196 are the same, respectively, as the pressure recesses 92 and 93, the grooves 94 and 95 and the drain pockets 96 in plate 73 and function in the same way to maintain a uniform lubricating film of liquid between plates 10 and 37. Therefore, further description is deemed unnecessary.

While it is preferable to provide bearing and wear plates between the valve and the end of the cylinder barrel for the same reasons that it is preferable to provide bearing and wear plates between swash plate 57 and cradle 63, the bearing and wear plates may be omitted from between the valve and the end of the cylinder barrel and the face of the valve may be made the same as the bearing face of plate 37 (Fig. 9) providing the motive liquid can be kept free of particles of foreign matter large enough to score the face of the valve and/or the end of the cylinder barrel. Also, the restricted passages (which correspond to the grooves 194 and 195 shown in Fig. 9 and through which liquid is supplied to the pressure recesses corresponding to recesses 192 and 193) may be omitted from the face of the valve and liquid may be supplied to the pressure recesses in a different manner.

Figure 17:
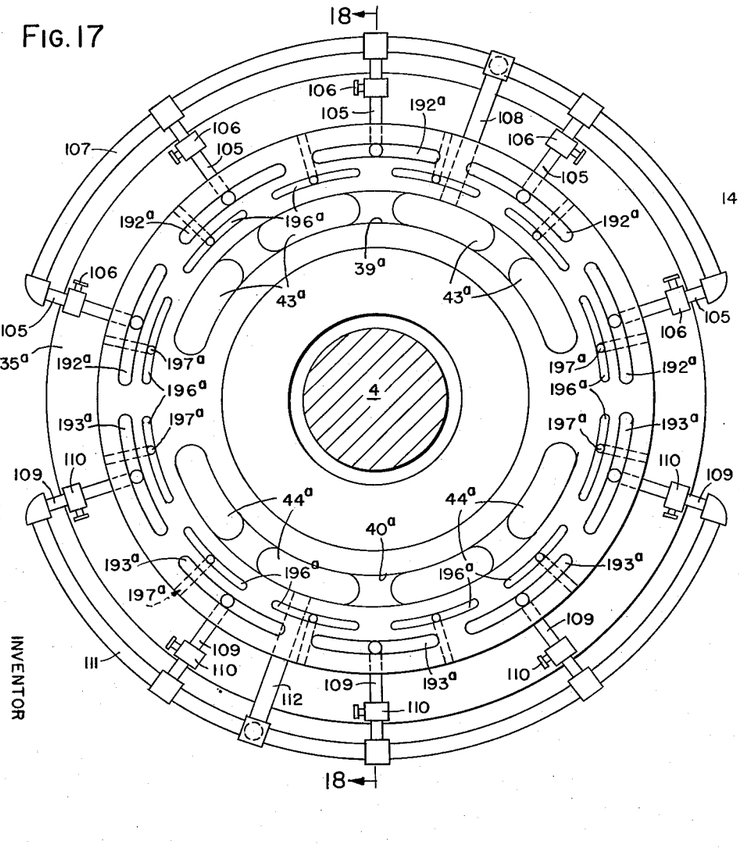
Fig. 17 is a view which corresponds to Fig. 4 but shows a modification of the invention.

Figs. 17 and 18 show a valve 35ª which may be substituted for valve 35 and arranged substantially in contact with the end of cylinder barrel 7. Since valve 35ª is substantially the same as valve 35 except that it is provided with means for maintaining a uniform lubricating film between its face and the end of cylinder barrel 7, it has not been completely illustrated and the like parts have been indicated by like reference numerals with the exponent "a" added to the numerals applied to valve 35ª so that only a brief description is deemed necessary.

As shown, valve 35ª is prevented from rotating by two pins 36ª and it is urged against the end of cylinder barrel 7 by a plurality of hold-up motors 45ª and a plurality of hold-up motors 46ª which communicate, respectively, through holes 43ª and 44ª with two diametrically opposed arcuate ports 39ª and 40ª with which each cylinder port 15 registers alternately during rotation of cylinder barrel 7.

Valve 35ª has formed in the face thereof a plurality of pressure recesses 192ª which are radially outward from port 39ª, a plurality of pressure recesses 193ª which are radially outward from port 40ª, and a plurality of drain pockets 196ª which are arranged between the valve ports and the pressure recesses. Each pocket 196ª is connected to drain by hole 197ª which extends therefrom axially inward and then radially outward through valve 35ª.

Each pressure recess 192ª communicates with the inner end of a restricted passage shown as being a channel 105 having a needle valve 106 connected therein. The outer ends of the several channels 105 are connected to a distributing channel 107 which is connected by a channel 108 to one of the holes 43ª in communication with valve port 39ª. Likewise, each pressure recess 193ª communicates with the inner end of a restricted passage shown as being a channel 109 having a needle valve 110 connected therein. The outer ends of the several channels 109 are connected to a distributing channel 111 which is connected by a channel 112 to one of the holes 44ª in communication with valve port 40ª.

The arrangement is such that, when port 39ª is the high pressure port, liquid can flow therefrom through holes 43ª, channels 108 and 107 and restricted passages 105—106 into pressure recesses 192ª and maintain pressure therein. Likewise, when port 40ª is the high pressure port, liquid can flow therefrom through holes 44ª, channels 112 and 111 and restricted passages 109—110 into pressure recesses 193ª and maintain pressure therein. The pressure recesses 192ª and 193ª, the drain pockets 196ª and the restricted passages 105—106 and 109—110 function to maintain a uniform film of liquid between valve 35ᵃ and cylinder barrel 7 in the same way that pressure recesses 92 and 93, drain pockets 96, and restricted passages 94 and 95 (Fig. 10) function to maintain a uniform film of liquid between plates 72 and 73 as previously explained. Therefore, further description or explanation is deemed unnecessary.

The invention herein set forth is susceptible of other modifications and adaptations without departure from the scope of the invention which is hereby claimed as follows:

1. In a hydrodynamic machine operable as a pump and as a motor and having a rotatable shaft radially rigidly supported, a first member rigidly mounted on said shaft for rotation therewith and provided with a flat face having holes in a circular row concentric with said shaft and successively supplied with liquid under the operating pressure of said machine, a non-rotatable second member restrained from movement axially of said shaft and having a flat face parallel and opposed to the flat face on the first member, and means urging said members toward each other with a force substantially proportional to the pressure in said holes, the improvement comprising a flat thrust transmitting plate and an opposed flat thrust receiving bearing plate disposed between the opposed faces of said members, means securing said thrust plate in non-rotatable relation to said rotatable member and permitting relative axial movement therebetween, said thrust plate having ports in opposite faces thereof connected by axial passages in said thrust plate in alignment with said holes in said rotatable member, means securing said bearing plate in non-rotatable relation to said second member and permitting relative axial movement therebetween, said bearing plate having diametrically opposed ports in front and back faces thereof connected by axial passages in said bearing plate and arranged so that said ports in said thrust plate alternately register with said ports in said bearing plate, drain recesses in the back faces of each of said plates and in a front face of one of said plates, said drain recesses connected to exhaust and spaced radially outward of said ports, pressure recesses disposed only in a front face of one of said plates radially outward of said drain recesses, and a restriction passage in a front face of one of said plates connecting each said pressure recess with one of said ports so that the hydrostatic forces urging said plates together are opposed by equal hydrostatic forces tending to separate them and so that the hydrostatic forces tending to separate each of said plates from the supporting member is slightly less than the hydrostatic forces between said plates.

2. In a hydrodynamic machine operable as a pump and as a motor and having a rotatable shaft, a rotatable member mounted on said shaft for rotation therewith and provided with a flat face having extending therethrough in a circular row around the axis of said shaft a plurality of holes which are successively supplied with liquid under the operating pressure of said machine as said member rotates, a non-rotatable second member restrained from movement axially of said shaft and having a flat face adjacent and parallel to the flat face on said rotatable member, piston means for urging said members toward one another with a force substantially proportional to the pressure in said holes, the improvement comprising an annular bearing plate disposed between said members, means supporting said bearing plate on said second member for axial movement relative thereto and in non-rotatable relation thereto, said bearing plate having a bearing face adjacent said rotatable member with diametrically opposed arcuate ports formed therein with which said holes in said rotatable member alternately register as said shaft rotates, circumferentially spaced pressure recesses formed in said bearing face and spaced radially of said ports, a limited capacity passage connecting each said pressure recess to an adjacent said arcuate port, drain recesses connected to exhaust and arranged between said ports and said pressure recesses, a pocket in the face of said rotatable member at the same radial distance as said pressure recesses to successively register with each of said pressure recesses, and an aperture in said bearing plate connected to exhaust and arranged so that said pocket simultaneously registers with said aperture and one of said pressure recesses for each revolution of said rotatable member.

3. In a hydrodynamic machine operable as a pump and as a motor and having a rotatable shaft, a first member mounted on said shaft for rotation therewith and provided with a flat face having holes in a circular row concentric with said shaft and successively supplied with liquid under the operating pressure of said machine, a non-rotatable second member restrained from movement axially of said shaft and having a flat face parallel and opposed to the flat face on the first member, and means urging said members toward each other with a force substantially proportional to the pressure in said holes, the improvement comprising a flat thrust transmitting plate and an opposed flat thrust receiving bearing plate disposed between the opposed faces of said members, means securing said thrust plate in non-rotatable relation to said rotatable member and permitting relative axial movement therebetween, said thrust plate having ports in opposite faces thereof connected by axial passages in said thrust plate in alignment with said holes in said rotatable member, means securing said bearing plate in non-rotatable relation to said second member and permitting relative axial movement therebetween, said bearing plate having diametrically opposed ports in front and back faces thereof connected by axial passages in said bearing plate and arranged so that said ports in said thrust plate alternately register with said ports in said bearing plate, drain recesses in the back faces of each of said plates and in a front face of one of said plates, said drain recesses connected to exhaust and spaced radially outward of said ports, pressure recesses disposed only in a front face of one of said plates radially outward of said drain recesses, and a restriction passage in a front face of one of said plates connecting each said pressure recess with one of said ports, and said thrust bearing including means for cleaning the pressure recesses comprising a drain hole in the front face of one of said plates and a pocket in the front face of the other said plate arranged so that said pocket simultaneously registers with both said drain hole and one of said pressure recesses for each revolution of said shaft.

4. A machine having a non-rotatable first member restrained from movement axially of said machine, a rotary member having an annular flat face and a plurality of holes extending through said face in a circular row and normally filled with liquid, means for causing pressure to be created in said holes, and means for urging said rotary member toward said first member, an annular flat bearing face arranged upon said first member substantially in contact with the flat face on said rotary member, port means formed in said bearing face adjacent the radially inner periphery thereof and so located that said holes communicate therewith during rotation of said rotary member, a plurality of relatively closely spaced and circumferentially arranged drain recesses in said bearing face spaced radially outwardly of said arcuate ports and operable therewith to provide a first effective pressure area subject to said operating pressure, axial ducts in said first member each opening within one of said drain recesses, passage means in said first member remote from said bearing face connecting said axial ducts to exhaust, a plurality of circumferentially spaced pressure recesses formed in said bearing face and spaced radially outwardly of said drain recesses and operable therewith to provide a second effective pressure area subject to the pressures in said pressure recesses, and a limited capacity passage in said bearing face connecting said port means to said pressure recesses and being the only circumferential interruption in said face in said second effective pressure area, a thrust transmitting wear plate adapted for mounting on said rotatable member and having axial holes therethrough for alignment with the holes in said rotatable member and for registering alternately with said ports in said bearing surface, said wear plate having a pocket in the face thereof adjacent said bearing surface for successively registering with the pressure recesses, and an axial aperture through said first member and connected to drain remote from said bearing surface and arranged so that said pocket is momentarily in register with both said aperture and one of said pressure recesses for each revolution of said rotatable member.

5. In a hydrodynamic machine operable as a pump and as a motor and having a rotatable shaft, a first member mounted on said shaft for rotation therewith and provided with a flat face having holes in a circular row concentric with said shaft and successively supplied with liquid under the operating pressure of said machine, a non-rotatable second member restrained from movement axially of said shaft and having a flat face parallel and opposed to the flat face on the first member, and means urging said members toward each other with a force substantially proportional to the pressure in said holes, the improvement comprising a flat thrust transmitting plate and an opposed flat thrust receiving bearing plate disposed between the opposed faces of said members, means securing said thrust plate in non-rotatable relation to said rotatable member and permitting relative axial movement therebetween, said thrust plate having ports in opposite faces thereof connected by axial passages in said thrust plate in alignment with said holes in said rotatable member, means securing said bearing plate in non-rotatable relation to said second member and permitting relative axial movement therebetween, said bearing plate having diametrically opposed ports in front and back faces thereof connected by axial passages in said bearing plate and arranged so that said ports in said thrust plate alternately register with said ports in said bearing plate, pressure recesses disposed only in a front face of one of said plates radially outward of said ports, and a restriction passage in a front face of one of said plates connecting each said pressure recess with one of said ports, drain recesses in the back faces of each of said plates and radial drain grooves disposed only in the back faces of said plates and connecting the back face of said drain recesses to exhaust, circumferentially spaced drain recesses disposed in one of the front faces between said ports and the pressure recesses, and axial drain passages in said bearing plate interconnecting said drain recesses in front and back faces.

6. In a hydrodynamic machine operable as a pump and as a motor and having a rotatable shaft, a first member mounted on said shaft for rotation therewith and provided with a flat face having holes in a circular row concentric with said shaft and successively supplied with liquid under the operating pressure of said machine, a non-rotatable second member restrained from movement axially of said shaft and having a flat face parallel and opposed to the flat face on the first member, and means urging said members toward each other with a force substantially proportional to the pressure in said holes, the improvement comprising a flat thrust receiving bearing plate disposed between the opposed faces of said members, means securing said bearing plate in non-rotatable relation to said second member and permitting relative axial movement therebetween, said bearing plate having diametrically opposed arcuate ports in front and back faces thereof interconnected by axial passages in said bearing plate and said ports arranged so that said holes in said first member alternately communicate therewith, pressure recesses disposed only in a front face of said bearing plate radially outward of said ports, limited capacity passages each connecting one of said pressure recesses with an adjacent one of said ports for restricted flow therebetween, circumferentially extending drain recesses concentrically arranged in the face of the bearing plate between said pressure recesses and said ports, an annular drain recess in the back face of the bearing plate, axial drain passages through the bearing plate interconnecting the drain recesses in the front face with the drain recess in the back face, and radial drain grooves leading to exhaust disposed only in the back face of the bearing plate and connected to said annular drain recess.

References Cited in the file of this patent

UNITED STATES PATENTS

| | | |
|---|---|---|
| Re. 20,026 | Thoma | June 30, 1936 |
| 2,155,455 | Thoma | Apr. 25, 1939 |
| 2,250,512 | Vickers | July 29, 1941 |
| 2,298,850 | Vickers | Oct. 13, 1942 |
| 2,337,821 | Huber | Dec. 28, 1943 |
| 2,463,299 | Nixon | Mar. 1, 1949 |
| 2,546,583 | Born | Mar. 27, 1951 |
| 2,646,754 | Overbeke | July 28, 1953 |
| 2,699,123 | Bonnette et al. | Jan. 16, 1955 |
| 2,721,519 | Henrichsen | Oct. 25, 1955 |
| 2,737,899 | Bonnette et al. | Mar. 13, 1956 |
| 2,757,612 | Shaw | Aug. 7, 1956 |
| 2,847,938 | Gondek | Aug. 18, 1958 |

FOREIGN PATENTS

| | | |
|---|---|---|
| 220,417 | Great Britain | Aug. 21, 1924 |
| 604,168 | Great Britain | June 29, 1948 |